US007925778B1

(12) United States Patent
Wijnands et al.

(10) Patent No.: US 7,925,778 B1
(45) Date of Patent: Apr. 12, 2011

(54) METHOD AND APPARATUS FOR PROVIDING MULTICAST MESSAGES ACROSS A DATA COMMUNICATION NETWORK

(75) Inventors: Ijsbrand Wijnands, Diegem (BE); Arjen Boers, Barcelona (ES); Yiqun Cai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1509 days.

(21) Appl. No.: 10/779,183

(22) Filed: Feb. 13, 2004

(51) Int. Cl.
*G06F 15/173* (2006.01)

(52) U.S. Cl. ......... 709/238; 370/390; 370/392; 370/389

(58) Field of Classification Search .............. 370/389, 370/390, 392, 466, 351, 328, 395.2, 401; 209/207; 359/124; 709/238, 245; 398/26
See application file for complete search history.

(56) References Cited

U.S. PATENT DOCUMENTS

| 5,323,362 | A | 6/1994 | Aziz | |
|---|---|---|---|---|
| 6,078,590 | A | 6/2000 | Farinacci et al. | |
| 6,147,970 | A | 11/2000 | Troxel | |
| 6,154,463 | A | 11/2000 | Aggarwal et al. | |
| 6,185,210 | B1 | 2/2001 | Troxel | |
| 6,314,105 | B1 | 11/2001 | Luong | |
| 6,339,595 | B1 * | 1/2002 | Rekhter et al. | 370/392 |
| 6,385,647 | B1 | 5/2002 | Willis et al. | |
| 6,415,323 | B1 | 7/2002 | McCanne et al. | |
| 6,473,421 | B1 * | 10/2002 | Tappan | 370/351 |
| 6,483,832 | B1 * | 11/2002 | Civanlar et al. | 370/390 |
| 6,484,257 | B1 | 11/2002 | Ellis | |
| 6,526,056 | B1 * | 2/2003 | Rekhter et al. | 370/392 |
| 6,580,722 | B1 | 6/2003 | Perlman | |
| 6,584,082 | B1 | 6/2003 | Willis et al. | |
| 6,625,773 | B1 | 9/2003 | Boivie et al. | |
| 6,633,835 | B1 | 10/2003 | Moran et al. | |
| 6,636,895 | B1 * | 10/2003 | Li et al. | 709/238 |
| 6,654,796 | B1 | 11/2003 | Slater et al. | |
| 6,701,361 | B1 | 3/2004 | Meier | |
| 6,721,315 | B1 * | 4/2004 | Xiong et al. | 370/389 |
| 6,732,189 | B1 | 5/2004 | Novaes | |
| 6,735,200 | B1 | 5/2004 | Novaes | |
| 6,791,981 | B1 | 9/2004 | Novaes | |
| 6,801,940 | B1 | 10/2004 | Moran et al. | |
| 6,804,492 | B2 | 10/2004 | Kay | |
| 6,810,417 | B2 | 10/2004 | Lee | |
| 6,839,348 | B2 | 1/2005 | Tang et al. | |
| 6,973,057 | B1 * | 12/2005 | Forslow | 370/328 |
| 7,082,140 | B1 * | 7/2006 | Hass | 370/466 |

(Continued)

OTHER PUBLICATIONS

Cisco Technology, Inc., "MPLS Virtual Private Networks," Cisco IOS Release 12.0(5)T, pp. 1-50.

(Continued)

*Primary Examiner* — Dustin Nguyen
(74) *Attorney, Agent, or Firm* — Hickman Palermo Truong & Becker LLP

(57) ABSTRACT

A method and apparatus for providing multicast messages across a data communication network, the method comprising receiving a multicast message and adding to the multicast message a vector stack including at least one address of a router to which the multicast message is to be sent. The multicast message and the vector stack are then forwarded. At the first router indicated by the vector stack, the next address to which the multicast message is to be sent is read. This is repeated as necessary until the multicast message is received by the final address in the vector stack. The multicast message is then routed to the address indicated in the original multicast message.

27 Claims, 9 Drawing Sheets

U.S. PATENT DOCUMENTS

| | | | |
|---|---|---|---|
| 7,120,165 B2 * | 10/2006 | Kasvand-Harris et al. | 370/466 |
| 7,139,278 B2 * | 11/2006 | Gibson et al. | 370/401 |
| 7,158,497 B2 | 1/2007 | Li et al. | |
| 7,281,058 B1 * | 10/2007 | Shepherd et al. | 709/238 |
| 7,484,003 B2 | 1/2009 | Chandra et al. | |
| 7,570,605 B1 | 8/2009 | Aggarwal et al. | |
| 2001/0024443 A1 | 9/2001 | Alriksson et al. | |
| 2002/0004843 A1 | 1/2002 | Andersson et al. | |
| 2002/0012320 A1 | 1/2002 | Ogier | |
| 2002/0023164 A1 | 2/2002 | Lahr | |
| 2002/0031107 A1 | 3/2002 | Li et al. | |
| 2002/0046287 A1 | 4/2002 | La Porta et al. | |
| 2002/0062388 A1 | 5/2002 | Ogier et al. | |
| 2002/0067725 A1 | 6/2002 | Oguchi et al. | |
| 2002/0075807 A1 | 6/2002 | Troxel et al. | |
| 2002/0075866 A1 | 6/2002 | Troxel et al. | |
| 2002/0078127 A1 | 6/2002 | Troxel | |
| 2002/0078238 A1 | 6/2002 | Troxel et al. | |
| 2002/0085498 A1 | 7/2002 | Nakamichi et al. | |
| 2002/0116529 A1 | 8/2002 | Hayden | |
| 2002/0147011 A1 | 10/2002 | Kay | |
| 2002/0172155 A1 | 11/2002 | Kasvand-Harris et al. | |
| 2002/0184368 A1 | 12/2002 | Wang | |
| 2003/0037109 A1 | 2/2003 | Newman et al. | |
| 2003/0048790 A1 * | 3/2003 | McAllister et al. | 370/395.2 |
| 2003/0051048 A1 | 3/2003 | Watson et al. | |
| 2003/0053457 A1 | 3/2003 | Fox et al. | |
| 2003/0063608 A1 | 4/2003 | Moonen | |
| 2003/0067928 A1 | 4/2003 | Gonda | |
| 2003/0074584 A1 | 4/2003 | Ellis | |
| 2003/0105865 A1 | 6/2003 | McCanne et al. | |
| 2003/0110288 A1 | 6/2003 | Ramanujan et al. | |
| 2003/0147405 A1 | 8/2003 | Khill | |
| 2003/0152063 A1 | 8/2003 | Giese et al. | |
| 2003/0165140 A1 | 9/2003 | Tang et al. | |
| 2003/0172145 A1 | 9/2003 | Nguyen | |
| 2003/0174706 A1 * | 9/2003 | Shankar et al. | 370/393 |
| 2003/0179742 A1 | 9/2003 | Ogier et al. | |
| 2003/0200307 A1 | 10/2003 | Raju et al. | |
| 2003/0212821 A1 | 11/2003 | Gillies et al. | |
| 2004/0025018 A1 | 2/2004 | Haas et al. | |
| 2004/0037279 A1 | 2/2004 | Zelig et al. | |
| 2004/0039839 A1 | 2/2004 | Kalyanaraman et al. | |
| 2004/0054799 A1 | 3/2004 | Meier et al. | |
| 2004/0062267 A1 | 4/2004 | Minami et al. | |
| 2004/0081154 A1 | 4/2004 | Kouvelas | |
| 2004/0090919 A1 | 5/2004 | Callon et al. | |
| 2004/0103282 A1 | 5/2004 | Meier et al. | |
| 2004/0133619 A1 | 7/2004 | Zelig | |
| 2004/0165600 A1 | 8/2004 | Lee | |
| 2004/0205215 A1 | 10/2004 | Kouvelas et al. | |
| 2005/0108419 A1 | 5/2005 | Eubanks | |
| 2006/0147204 A1 * | 7/2006 | Yasukawa et al. | 398/26 |
| 2009/0086644 A1 | 4/2009 | Kompella et al. | |

OTHER PUBLICATIONS

Cisco Technology, Inc. "IP Multicast Technology Overview," DIG: Enterprise Campus Technology, Apr. 18, 2002, pp. 3-26.

Bates, et al., "Multiprotocol Extension for BGP-4" Feb. 1998 (pp. 1-9).

"Internet Protocol Multicast", Chapter 43, Internetworking Technologies Handbook (pp. 43-1 through 43-16).

* cited by examiner

METHOD AND APPARATUS FOR PROVIDING MULTICAST MESSAGES ACROSS A DATA COMMUNICATION NETWORK

FIELD OF THE INVENTION

The present invention generally relates to data communication networks. The invention relates more specifically to a method and apparatus for providing multicast messages across a data communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet packets of data are sent from a source to a destination via a network of elements including links (communication paths such as telephone or optical lines) and nodes (usually routers directing the packet along one or more of a plurality of links connected to it) according to one of various routing protocols, including internet protocol (IP).

Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information each node constructs a link state database (LSDB), which is a map of the entire network topology and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately. When there is a network change, information representing the change is flooded through the network, each node sending it to each adjacent node.

IP Multicast is a bandwidth-conserving technology that reduces traffic by simultaneously delivering a single stream of information from a source to a plurality of receiving devices, for instance to thousands of corporate recipients and homes. Examples of applications that take advantage of multicast technologies include video conferencing, corporate communications, distance learning, and distribution of software, stock quotes and news. IP multicast delivers source traffic to multiple receivers without burdening the source or the receivers while using a minimum of network bandwidth. Multicast packets are replicated in the network at the point where paths diverge by routers enabled with Protocol Independent Multicast (PIM) and other supporting multicast protocols, resulting in efficient delivery of data to multiple receivers. The routers use Protocol Independent Multicast (PIM) to dynamically create a multicast distribution tree.

This can be understood by referring to FIG. 1 which depicts an illustrative network diagram showing a conventional technique for providing multicast messages. Receivers 2 within a designated multicast group 3 are interested in receiving a data stream (for instance video) from a source 4. The receivers 2 indicate their interest by sending an Internet Group Management Protocol (IGMP) host report to the routers 6 in the network 8. The routers 6 are then responsible for delivering the data from the source 4 to the receivers 2.

FIG. 2 is a diagram illustrating a Virtual Private Network (VPN). The VPN comprises a number of VPNs, 10, 11, 12 connected together via a single Autonomous System (AS), service provider backbone network 13. Each VPN may relate to a single site, as is the case with the VPNs indicated by numerals 10 and 12, or a plurality of sites as is the case with the VPN indicated by the numeral 11. Each VPN includes a customer edge (CE) device 14. Customer devices (not shown) are attached to the CE routers 14. The VPNs 10, 11, 12 are connected together via a service provider backbone 13. The service provider backbone 13 includes provider edge (PE) routers 16 which are connected to the CE routers 14. The service provider backbone network 13 also comprises a plurality of P routers 18 which route data from one PE 16 to another. Thus customer devices connected to the CE routers 14 use the VPNs to exchange information between devices. Only the PE routers 16 are aware of the VPNs 10, 11, 12.

Each VPN is associated with one or more VPN routing/forwarding instances (VRFs). A VRF defines the VPN membership of a customer site attached to a PE router. A VRF consists of an IP routing table, a derived forwarding table, a set of indicators that uses the forwarding table, and a set of rules and routing protocol parameters that control the information that is included in the routing table.

A service provider edge (PE) router 16 can learn an IP prefix from a customer edge router 14 by static configuration, through a BGP session with a CE router or through a routing information protocol (RIP) exchange with the CE router 14.

A Route Distinguisher (RD) is an 8-byte value that is concatenated with an IPv4 prefix to create a unique VPN IPv4 prefix. The IP prefix is a member of the IPv4 address family. After it learns the IP prefix, the PE converts it into a VPN-IPv4 prefix by combining it with an 8-byte route distinguisher (RD). The generated prefix is a member of the VPN-IPv4 address family. It serves to uniquely identify the customer address, even if the customer site is using globally non-unique (unregistered private) IP addresses. The route distinguisher used to generate the VPN-IPv4 prefix is specified by a configuration command associated with the VRF on the PE router.

Border Gateway Protocol (BGP) distributes reachability information for prefixes for each VPN. BGP communication takes place at two levels: within IP domains, known as autonomous systems (interior BGP or IBGP) and between autonomous systems (external BGP or EBGP). PE-PE or PE-RR (route reflector) sessions are IBGP sessions, and PE-CE sessions are EBGP sessions.

BGP propagates reachability information for VPN-IPv4 prefixes among PE routers 16 by means of BGP multiprotocol extensions (for example see RFC 2283, Multiprotocol Extensions for BGP-4) which define support for address families other than IPv4. It does this in a way that ensures the routes for a given VPN are learned only by other members of that VPN, enabling members of the VPN to communicate with each other.

Based on routing information stored in the VRF IP routing table and forwarding tables, packets are forwarded to their destination using multi-protocol label switching (MPLS). A PE router binds the label to each customer prefix learnt from the CE router 14 and includes the label in the network reachability information for the prefix that advertises to other PE routers. When a PE router 16 forwards a packet received from a CE router 14 across the provider network 13, it labels the packet with a label (an example of which is a PIM join) learned from the destination PE router. When the destination PE router 16 receives a label packet it pops the label and uses it to direct the packet to the correct CE router. Label forwarding across the provider backbone is based on either dynamic label switching or traffic engineered paths. A customer packet carries two levels of labels when traversing the backbone: a top label which directs the packet to the correct PE router and a second label which indicates how that PE router should forward the packets to the CE router.

Multicast Virtual Private Networks (MVPN) have been devised to provide a user with the ability to send multicast packets over VPNs. To achieve this, MVPN uses a Multicast GRE Tunnel to forward packets across a provider network. Customers can use the MVPN service from a provider to connect office locations as if they were virtually one network. The GRE Tunnel, also known as a Multicast Distribution Tunnel (MDT), is built across the provider network and spans a single BGP Autonomous System (AS).

However, it would be beneficial for the MDT to be spanned over multiple AS's since many customers have an internal network that is split into multiple AS's or have VPN sites that are connected to multiple service providers. This means that service providers, who may be competitors, would need to provide their internal IP address to each other to make the MDT reachable. The MDT is built between two Provider Edge (PE) routers, and other routers in between the PE routers need a way to select the RPF interface towards the other PE of the other AS or VPN. However service providers are unwilling to make their PE routers reachable via unicast for security reasons and therefore do not want to redistribute the PE information into other (competitor) domains.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing multicast messages across a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method of providing multicast messages across a data communication network
   4.0 Implementation Mechanisms—Hardware Overview
   5.0 Extensions and Alternatives 1.0 General Overview The needs identified in the foregoing Background, and other needs and objects that will become apparent for the following description, are achieved in the present invention, which comprises, in one aspect, a method for providing multicast messages across a data communication network, the method comprising: receiving a multicast message; adding to the multicast message a vector stack including at least one address of a router to which the multicast message is to be sent; and forwarding the multicast message and the vector stack. There is also provided a method of providing multicast messages across a data communication network, the method comprising: receiving at a receiving node of the network a multicast message having a vector stack including at least one address of a router to which the multicast message is to be sent. The first address of the vector stack is read and, when the first address of the vector stack corresponds to the address of the receiving node, the first address of the vector stack is removed and, when the vector stack includes a further vector, reading the next address to which the multicast message is to be sent and forwarding the multicast message in accordance with the next address. This is repeated as necessary until the multicast message is received by the final address in the vector stack at which point the multicast message is forwarded to the address indicated in the original multicast message.

In other aspects, the invention encompasses a computer apparatus and a computer-readable medium configured to carry out the foregoing steps.

2.0 Structural and Functional Overview

Figure 3:
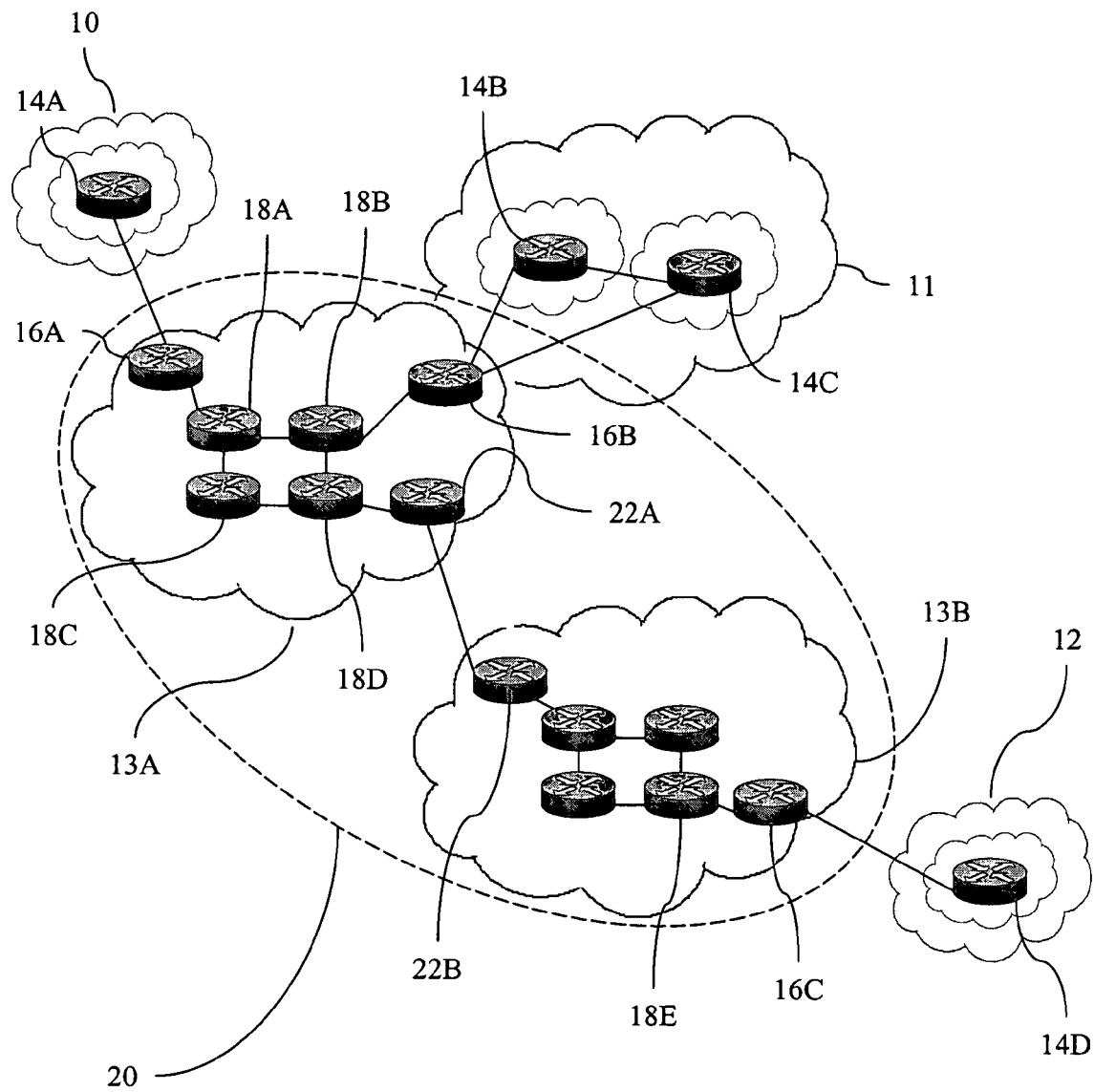
FIG. 3 is a diagram illustrating a first embodiment of a network.

FIG. 3 is a block diagram illustrating a first embodiment of a MVPN (Multicast Virtual Private Network). The MVPN comprises a service provider network 20, which comprises more than one Autonomous System (AS). The network illustrated in FIG. 3 comprises two autonomous systems indicated by reference numerals 13A and 13B. These Autonomous Systems may be service provider networks provided by, for instance, competitor internet service providers. Attached to the service provider network 20 are Customer Edge (CE) devices 14. Customer Edge devices are devices that are part of a customer's private network and are the device, typically a router, that interfaces to a router external to a customer's private network. In this context, "customer" refers to a first entity that has a customer relationship with a second entity that owns or operates service provider network 120. A description of a service provider network and customer elements is provided merely as one clear example. However, in alternative embodiments the approaches described herein are applicable to any network context regardless of whether a service provider or customer is present.

Each Autonomous System 13 comprises a Provider Edge (PE) router 16 that interfaces to a Customer Edge router 14. The PE router is then attached to one or more Provider (P) routers 18. FIG. 3 only shows a few provider routers 18 in each Autonomous System 13. However, it will be clear to the person skilled in the art that an Autonomous System typically comprises many Provider (P) routers 18 and Provider Edge (PE) routers 16.

Each Autonomous System 13 also comprises an Autonomous System Boundary Router (ASBR) 22. An ASBR router is located on the border of an Autonomous System that connects the Autonomous System to a backbone network. These routers are considered members of both the backbone and the attached Autonomous System. PIM uses the ABSR to discover and announce RP-set information for each group prefix to all the routers in a PIM domain. They therefore maintain routing tables describing both the backbone topology and the topology of the associated Autonomous System.

Thus, in the arrangement shown in FIG. 3, a provider may provide network connectivity to its customers over a single infrastructure, the provider network 20. In the embodiment shown in FIG. 3, the provider network 20 spans more than one Autonomous System 13. Although only two Autonomous Systems are shown, it will be clear to a person skilled in the art that the provider network 20 may comprise two or more Autonomous Systems and that each Autonomous System may include a plurality of PE routers 16, provider routers 18 and AS boundary routers 22. In addition, FIG. 3 for simplicity only shows one or two CE devices 14 attached to each Autonomous System. However, it will be clear to a person skilled in the art that a customer may have many more CE devices attached.

To enable Multicast, end nodes (for instance CE devices 14) inform the adjacent PE router 16 of the network layer Multicast addresses they wish to receive. This may be done using Internet Group Management Protocol (IGMP). Routers then use a technique (such as Protocol Independent Multicast) PIM to build a tree for the route. The PE routers 16 typically use a reverse path forwarding technique which is an optimized form of flooding. In reverse path forwarding a node accepts a packet from source S via interface N only if N is the interface you would forward to in order to reach S. This reduces the overhead of flooding considerably. Because a router accepts the packet only from one interface, it floods it only once. Thus, in the example shown in FIG. 3, consider when a source, for instance the CE router 14A of VPN 10, sends out a Multicast message. This message is flooded through the Multicast group which we will consider as being all the CE devices shown in FIG. 3. Thus the Multicast message is received by PE router 16A and forwarded to P router 18A. The P router 18A then forwards it to routers 18B and 18C. Router 18C then forwards it to router 18D which in turn forwards it to router 18B. Router 18B therefore receives two copies of the Multicast message. In a reverse path forwarding system, P router 18B accepts the packet from the router 18A or 18D which is the interface that router 18B would use to forward to in order to reach the source 14 in VPN 10. Router 18B then forwards the message on to PE router 16B which then forwards the message on to the CE devices 14 in VPN 11.

Figure 4:
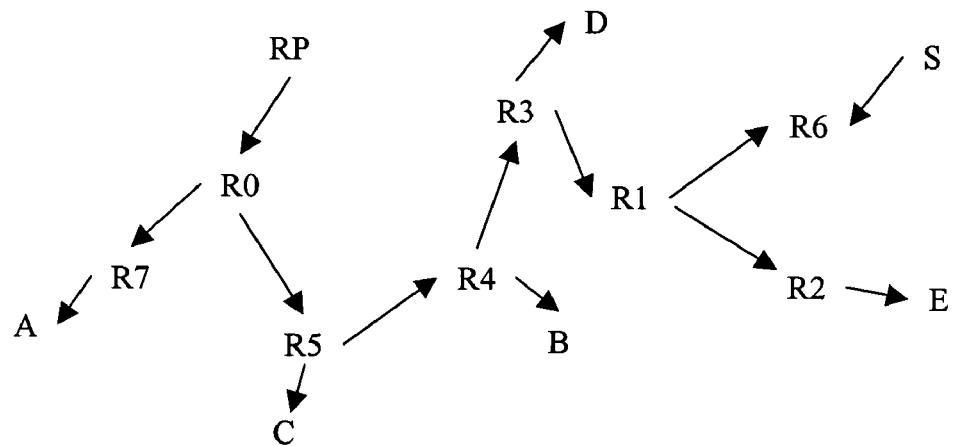
FIG. 4 is a diagram illustrating a tree building mechanism.

One way of implementing a Multicast system is to use a tree building protocol, for instance Protocol Independent Multicast (PIM). FIG. 4 illustrates the tree building mechanism of PIM. FIG. 4 shows an example of a Multicast group G of end nodes A, B, C, D and E and a network of routers R. To set up a multicast group, each member of the Multicast group A, B, C, D, E sends a join message to a central node known as the Rendezvous Point RP. In addition to the shared tree, rooted at the RP for this group G, routers may also join a (S,G) tree routed at S if, in their opinion, the volume of traffic from S makes it worthwhile. To prevent loops, with some nodes receiving traffic from S on the tree routed at RP and others receiving it on a tree routed at S, the shared tree is unidirectional. For a node other than RP to send a Multicast message on that tree, the data is tunneled to the RP before it can be Multicast to the nodes in the group G. This is achieved by the source S unicasting to RP by tunneling to RP. This is achieved by adding an IP header specifying the destination as the RP. The RP then sends it on the Multicast tree. In practice, in one approach, the RP is chosen in the following manner. Routers that are configured to be RPs unicast their ability to the ASBR 22 of the associated autonomous system. The ASBR then floods the identities of the RP candidates and the routers then decide which will be the RP by various means, for instance by applying a hash function that takes as input the group address G and the set of qualified candidates RPs and selects from that set the one that will be the RP for G. A group is then known by an 8-byte id of the form (source, G) where source identifies the source node and G defines the Multicast group.

To allow MVPN's to span multiple AS's, the customer VPNv4 routes are advertised to each of the PE routers that has information about the VPN. Such routes are customer routes and do not belong to the provider. We call the routes VPNv4 routes.

The routes may be advertised using BGP and follow the complete path from one PE to the other. The BGP VPNv4 routes may be advertised with a Next-Hop (NH) attribute. This NH indicates via which router the route is reachable. These NH's are global routes belonging to the provider.

When a user wishes to join a multicast group, a device associated with the user obtains the source and group address. This may be achieved in many ways. One way is for a node to direct the user to an intranet page which includes the source and group address of the multicast group of interest. This information is then input to the user device. When a host joins a multicast group, the directly connected PE router sends a PIM join message toward the rendezvous point (RP). The RP keeps track of multicast groups. Hosts that send multicast packets are registered with the RP by the first hop router of that host. The RP then sends join messages toward the source. At this point, packets are forwarded on a shared distribution tree. If the multicast traffic from a specific source is sufficient, the first hop router of the host may send join messages toward the source to build a source-based distribution tree.

Figure 1:
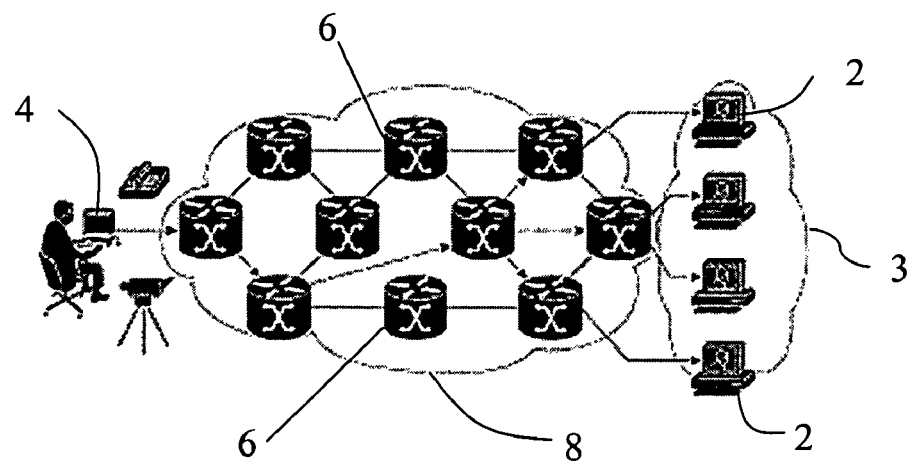
FIG. 1 is a diagram that illustrates IP Mulitcast.
Figure 2:
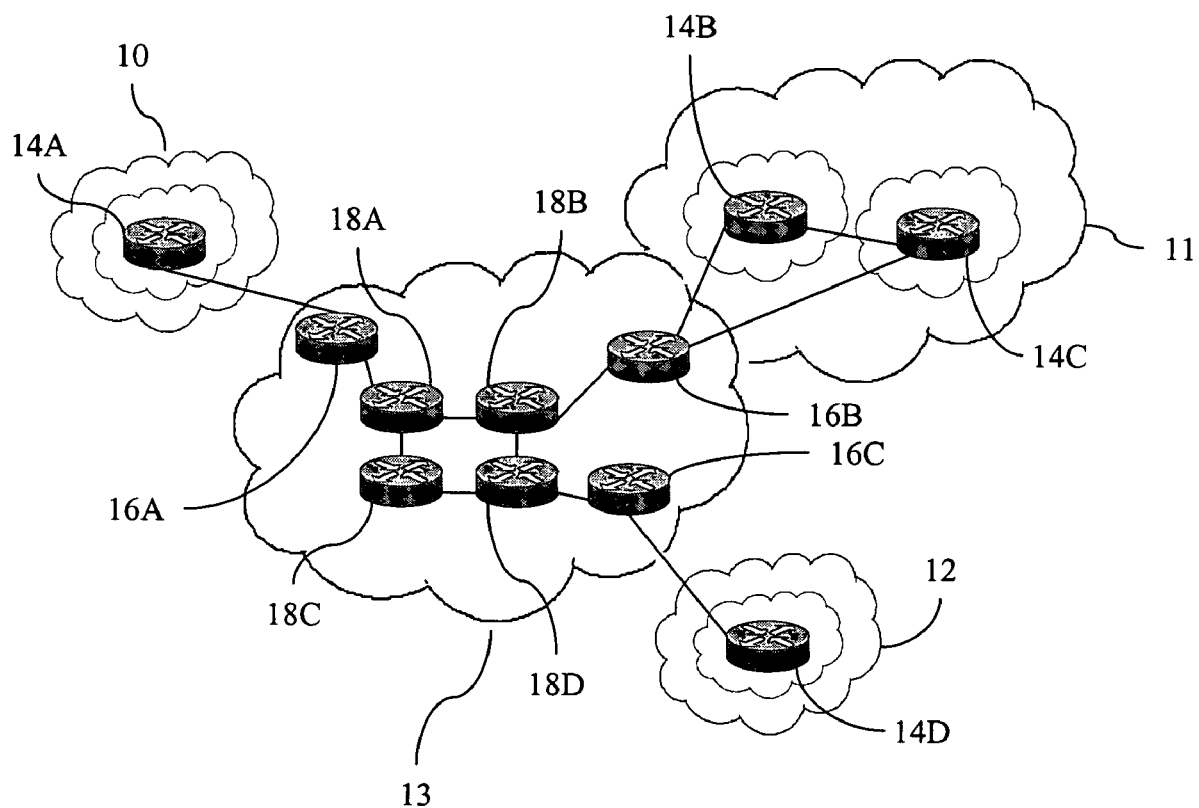
FIG. 2 is a diagram illustrating a VPN.

Thus when a host (attached to a CE device 14) wishes to join a multicast group, it sends a message which includes the multicast group and a source address (for instance obtained as described). This source is used by the receiving PE router to create a PIM join which is then sent to an upstream RP router. For a single autonomous system as shown in FIG. 2, say a host attached to the CE device 14D of VPN 12 wishes to join a Multicast group. The host sends a message (for instance using IGMP) to the CE router 14D. The CE router 14D then sends a message (e.g. a PIM message) to the PE router 16C with the group and the source address in it. Say that the router PE 16A is the Rendezvous Point for the group. The message sent by the CE device 14C therefore includes the group and the source address of the PE router 16A. The PE router 16C therefore receives the message from the CE device 14D and forms a PIM join message which is used to route the message to the source of the multicast group. This works within a single autonomous system. However, there are problems associated with establishing multicast via VPNs that employ more than one autonomous system, for instance the VPN shown in FIG. 3.

In this case, if PE router 16A is the Rendezvous Point for the Multicast group, RP is in a different AS from the sending router 14D. As addresses are not typically passed across AS boundaries, the PE device on one AS is unaware of the addresses for devices on another AS. The NH's of the VPNv4 routes are rewritten at the exit of the network (ASBR routers) and internal addresses are not advertised into the other AS. As a result, the VPNv4 becomes unreachable.

To overcome this issue, the receiving PE router adds a vector to the join message received from a CE device. This vector indicates the addresses of the ASBRs that the message needs to traverse to reach the intended source RP. This vector is referred to herein as a Multicast Vector Stack (MVS). This vector contains information that intermediate routers can use to determine where to RPF to so that a tree may be established. In the example given above, PE 16C will add a MVS to its PIM join. The MVS contains the address of ASBR 22B, then ASBR 22A. This information may be obtained by various means, for example via a static configuration or via a dynamic protocol such as BGP. The PE routers obtain the address of the ASBR in other ASs via BGP updates that carry additional information to tell PE routers which source to join. The PE router 16C looks up in its VRF the routing information for the source and adds this to the PIM join as a stack of vectors, each of which is read in turn. The P routers 18 then use this vector to route the message through the network.

When the PIM join with the MVS arrives at P router 18E, the P router 18E examines the first address in the MVS (ASBR 22B) and performs a RPF on that address and so forward the PIM join to that ASBR. When the ASBR 22B receives the PIM join, the ASBR 22B strips off this vector (as it relates to the receiving router) then examines the next address in the MVS (as the first is its own). The ASBR then forwards the PIM join to this address (ASBR 22A). When the PIM join arrives on ASBR 22A, an RPF check is done on the real address in the PIM join as there are no vectors left in the stack. ASBR 22A has all the information it needs to reach PE router 16A so no additional vector is necessary and the tree has been established.

Figure 5:
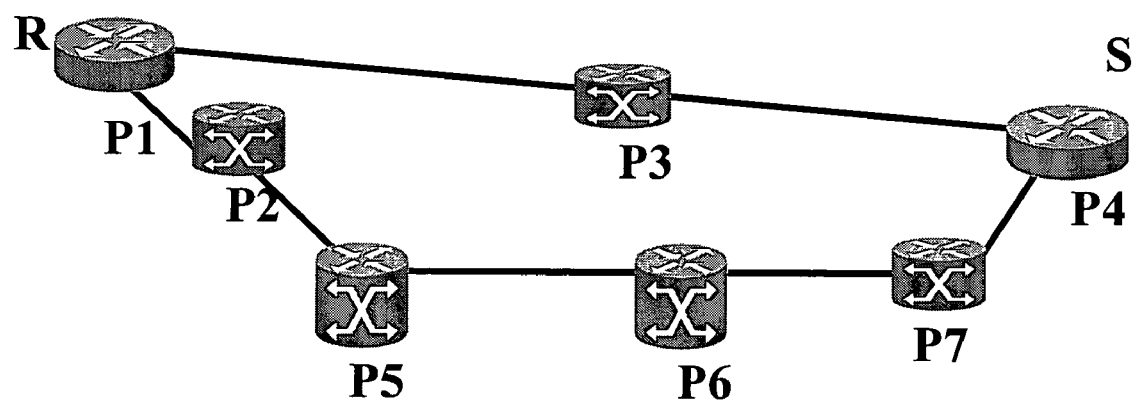
FIG. 5 is a simplified diagram illustrating the network shown in FIG. 3.

The technique of vector stacking may also be used within an AS. For instance, it may be used to traffic engineer multicast trees within an AS. Since the route taken through a network by a PIM join for a host determines the route taken by traffic for that host from the multicast source, the vector stack of the PIM join determines the route to be taken by subsequent traffic for the host. For instance, considering the network of routers shown in FIG. 5, the normal Shorted Path First tree from receiver R to source S is most likely to go via P1-P3-P4. If P1 is enabled to add a vector stack to the message from the receiver R for source S, then the router P1 may be configured to add a vector stack [P2, P5, P6, P7, P4] to the message received from the receiver R for source S and hence create a traffic-engineered path. This router in this case is likely to be configured statically.

Thus this solution allows a MDT to be built between PE's in different AS's without the need to make the PE routers globally addressable via unicast.

The MVS is either defined statically or learnt dynamically, for instance via BGP. The MVS may be added to PIM and included in the Join message which is sent to build the multicast tree. The PIM join is targeted to the first vector in the stack until the router is reached that owns this address. The router that owns the address is responsible for removing the vector from the list. If there is another vector in the list, this router targets that next vector. If the vector is the last vector in the list, the router uses the source information in the original multicast join message, as would happen in normal operation without a MVS.

With the MVS a traffic-engineered path is built from the receiver to the source. With the MVS it is possible to build multicast trees in absence of unicast routing for a particular source (MVPN Inter-AS scenario) or to build multicast trees that divert from the existing unicast routing (Traffic engineering).

If there is only one vector available, for example the BGP Next-Hop, or not all vectors are known, it may not be enough to build a MDT Tunnel across more than one AS in absence of unicast routing. If that is the case, a Route Distinguisher (RD) of the Tunnel source is included in the PIM Join. This RD allows intermediate routers that have BGP tables (ASBR 22A and ASBR 22B in FIG. 3) to find the necessary RPF information in the VPNv4 tables. Thus, the PIM join becomes capable of acting on VPNv4 information. The RD is the MDT of the remote PE router. With the (RD:source) a router that has a table is able to do a lookup directly in the BGP table and find the next-hop for this source. Routers that do not have a BGP table use the vector (S) for the RPF check as described above.

Figure 6:
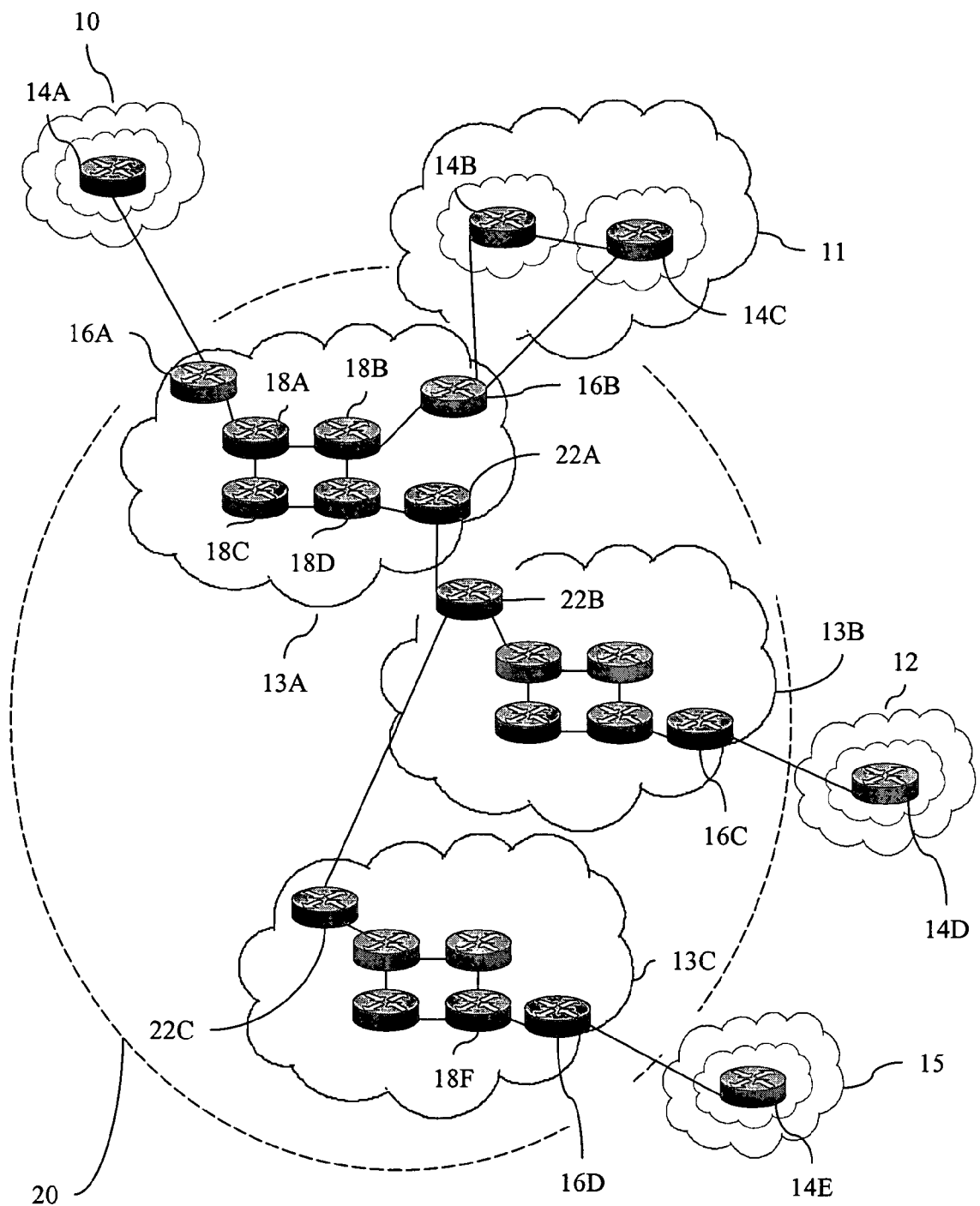
FIG. 6 is a diagram illustrating a second embodiment of a network.

FIG. 6 shows a second embodiment of a network. This VPN involves three AS, 13A, 13B and 13C, each of which has a VPN 10, 11, 12, 15 connected to it. Each AS has an ASBR 22 at the interface between the AS and the rest of the backbone. Say that CE device 14E wishes to send a PIM join to PE router 16A. The PE router 16D adds a MVS to the PIM join message. This vector indicates the addresses of the ASBRs that the message needs to traverse to reach the intended source RP. The MVS contains the address of ASBR 22C, then ASBR 22B, then ASBR 22A. This information may be obtained by various means, for example via a static configuration or via a dynamic protocol such as BGP.

When the PIM join with the MVS arrives at router 18F, the router 18F examines the first address in the MVS (ASBR 22C) and performs a RPF on that address and so forwards the PIM join to that ASBR. When the ASBR 22C receives the PIM join, the ASBR 22C removes the first vector from the stack (as that indicates ASBR 22C) and then examines the next address in the MVS. ASBR 22C then forwards the PIM join to the next address in the stack (ASBR 22B). When ASBR 22B receives the PIM join, the ASBR 22B removes the first vector from the stack (as that indicates ASBR 22B) and examines the next address in the MVS. ASBR 22B then forwards the PIM join to the next address in the stack (ASBR 22A). When the PIM join arrives at ASBR 22A, ASBR 22A removes the first vector from the stack as that vector indicates ASBR 22A. As there are now no vectors left in the stack, ASBR carries out an RPF check on the real address (S, G) in the PIM join. ASBR 22A has all the information it needs to reach the source PE router 16A of the multicast group so no additional vector stacking is necessary and the tree has been established.

3.0 Method of Providing Multicast Messages Across a Data Communication Network

Methods of providing multicast messages across a data communication network will now be described with reference to a network as shown in FIG. 3 for illustrative purposes only. Thus, the methods described herein are applicable to a network of any other configuration. Nodes in the network (e.g. PE routers and ASBRs) exchange reachability information with other enabled devices in the network and store received reachability information as routing/forwarding instances (e.g. VRF) in the node. In the first instance, we will consider that a host connected to the CE device 14D wishes to join a multicast group.

Figure 7:
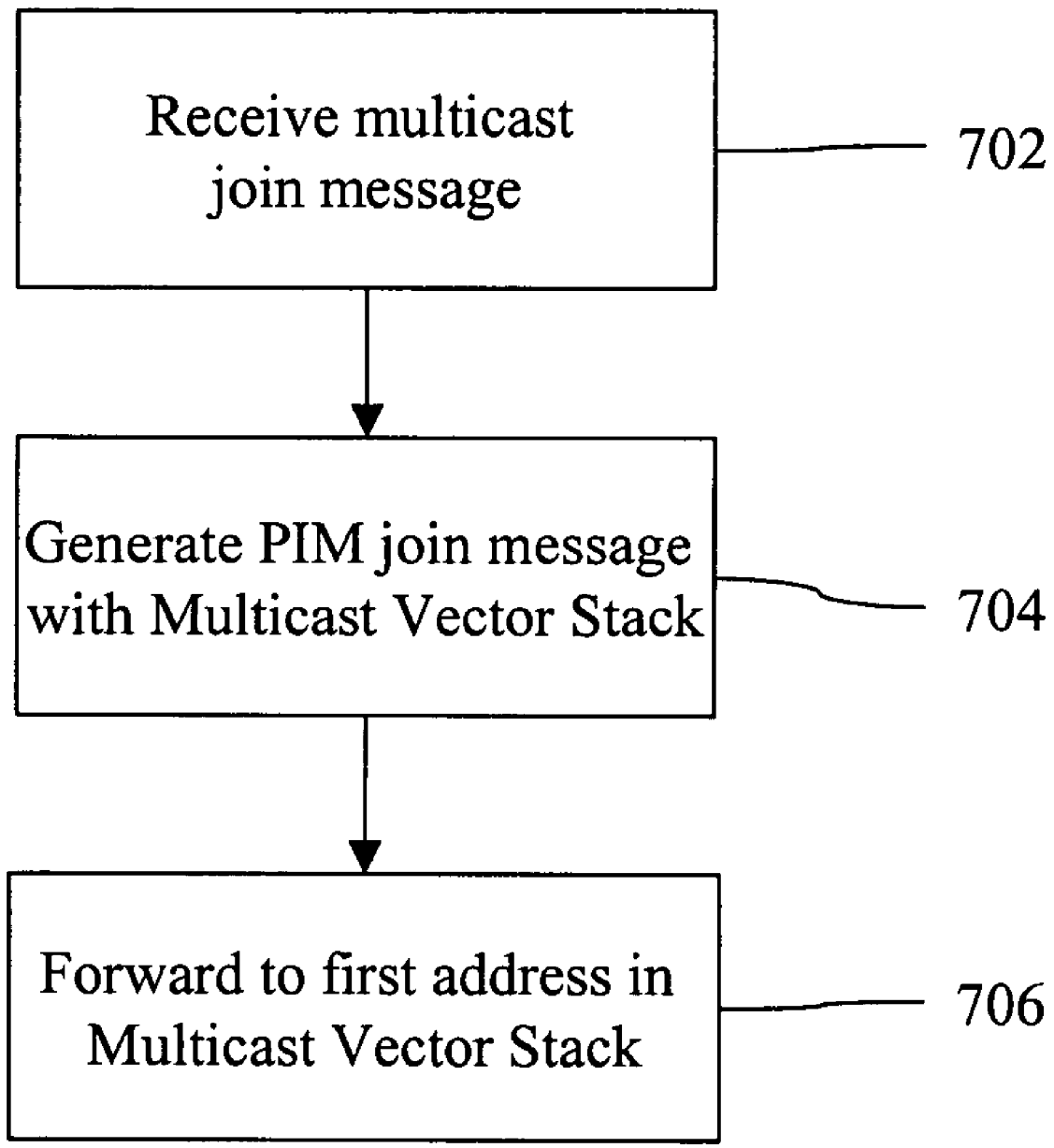
FIG. 7 is a flow diagram that illustrates a high level overview of one embodiment of a method at a PE router for providing multicast messages across a data communication network.

FIG. 7 is a flowchart illustrating an embodiment of a method at a PE router for providing multicast messages across a data communication network. PE router 16D receives a message (step 702) from CE device 14D that a host connected to the CE device wishes to join a multicast group. An example of such a message is of the form ip igmp join-group group-address. The PE router then generates (step 704) an adapted multicast join message with a Multicast Vector Stack (MVS). The vectors of the MVS are determined from the information in the VRF for the address of the multicast group. An example of a proposed syntax for this message may be: "ip multicast rpf vector". The vector inserted is the BGP next hop. A syntax for multiple vectors could for example be: "ip multicast rpf vector [vector1, vector2, vector 3 etc]. The group and source address need not be configured as they will be provided by the downstream router via a pim join message. The PE router then (step 706) sends the multicast join message with the MVS into the network to be forwarded to the first address indicated in the MVS.

The PE router generates the adapted multicast join message by looking up in its forwarding table any routing information relating to the group-address of the multicast group. From this routing table the PE router can determine the route to be taken through the network and the PE router adds vectors to the MVS that indicate PEs or ASBRs in the network. The vectors in the MVS allow intervening P routers to route multicast join messages for other ASs using the vectors of the stack. Otherwise intervening P routers would be unable to route multicast join messages of the form ip igmp join-group group-address as routing information for source-address will not be known to the P routers if the source-address is in a different AS. It should be noted that group and source addresses are almost never statically configured, so the syntax ip igmp join-group group-address may be omitted.

Figure 8:
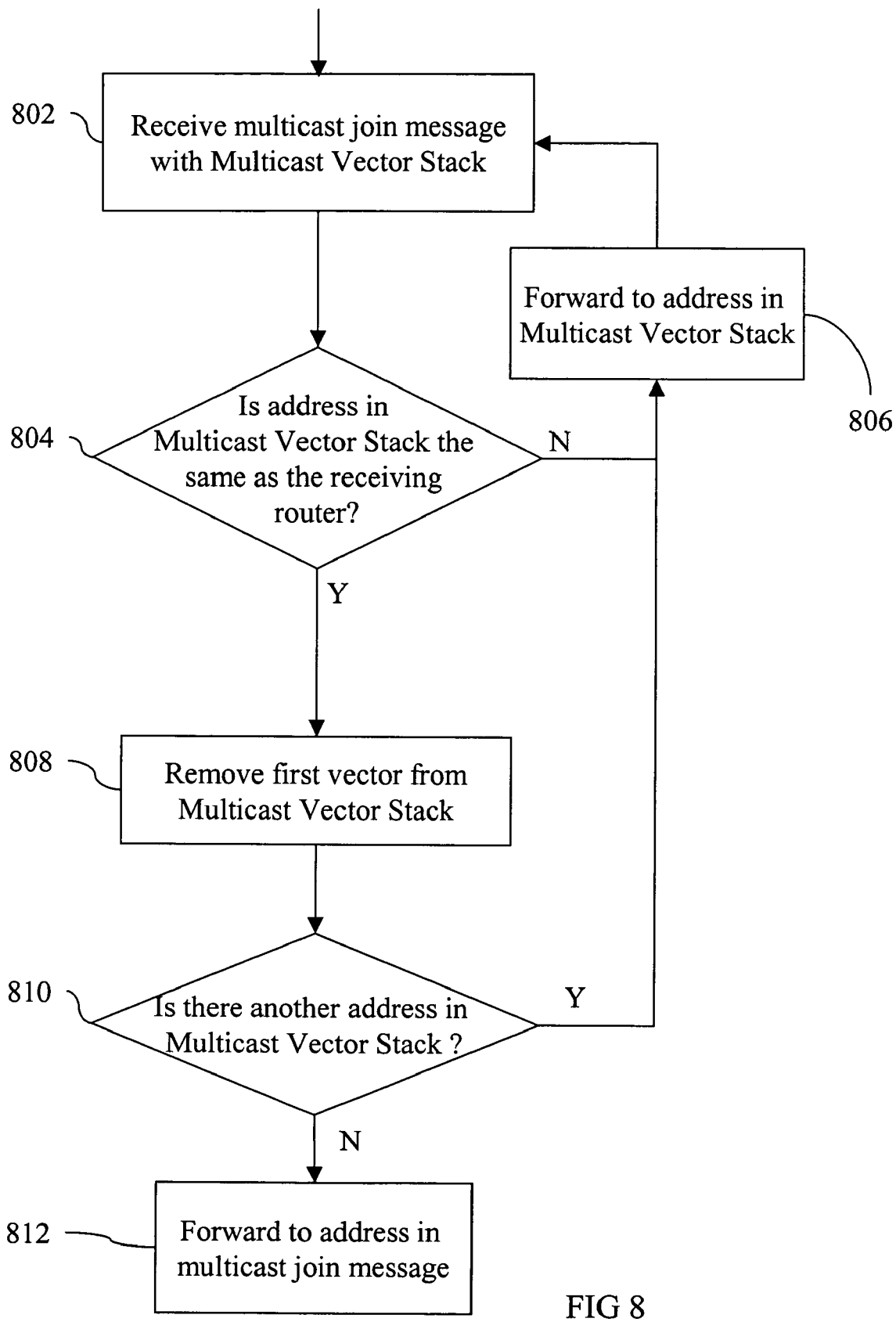
FIG. 8 is a flowchart illustrating an embodiment of a method for providing multicast messages across a data communication network.

FIG. 8 is a flowchart illustrating an embodiment of a method for providing multicast messages across a data communication network. The multicast join message with the MVS, generated by the initial PE router, is sent out into the network and is received by other nodes in the network (P routers, PE routers, ASBRs, etc). On receipt of a multicast join message with a MVS (step 802), a node determines if the address at the top of the Multicast Vector Stack is the same as the address of the receiving node (step 804). If this is not the case (for instance the receiving node is a P router) then the multicast join message with a MVS is forwarded on through the network (step 806) using routing information at the node for the address given at the top of the vector stack.

If the address at the top of the Multicast Vector Stack is the same as the address of the receiving node (step 804) (for instance, say the receiving node is ASBR router 22B), then the receiving node removes the vector from the top of the MVS (step 808) and determines whether there is another address in the MVS (step 810). If there is, the receiving node forwards the multicast join message with a MVS on through the network (step 806) towards the address now given at the top of the vector stack, according to routing information at the node. These steps may be repeated many times in the network as the multicast join message is routed through the network.

If, at step 810, the MVS does not include any other addresses, the receiving node looks at the address contained in the multicast join message and forwards the multicast join message on through the network (step 812) towards the address, according to routing information at the node.

Thus a multicast join message having a source address S in a first AS is routed through a network comprising a plurality of AS. The source address may not be known to all routers in a network comprising a plurality of AS and attaching a vector to the multicast join message allows the message to be routed through AS that do not know how to reach source S.

Figure 9:
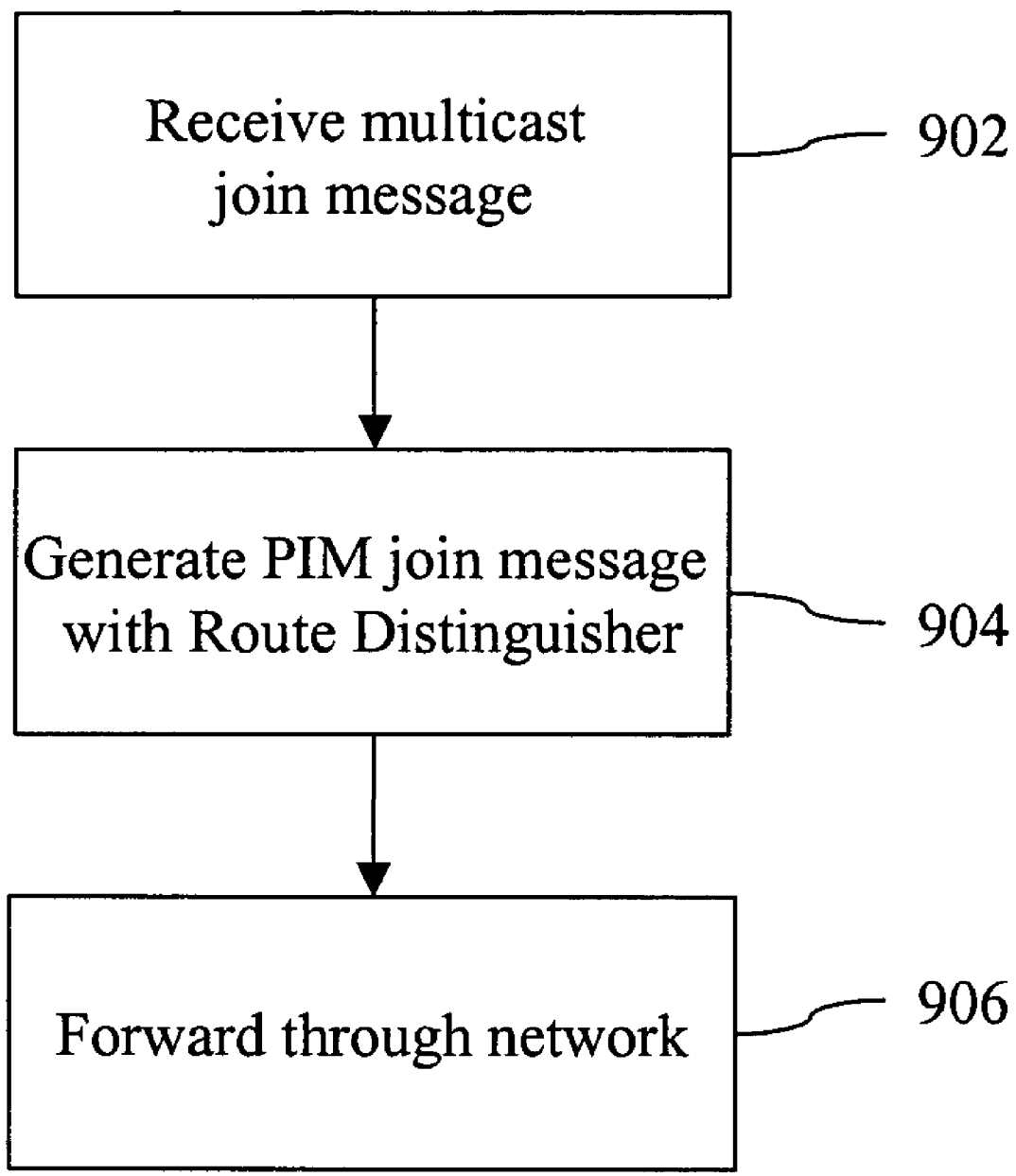
FIG. 9 is a flow diagram that illustrates a high level overview of a further embodiment of a method at a PE router for providing multicast messages across a data communication network.

FIG. 9 illustrates a further embodiment in which Route Distinguishers (RD) are involved. A Route Distinguisher is an 8-byte value that is concatenated with an IPv4 prefix to create a unique VPN IPv4 prefix. The Route Distinguisher is used by nodes that exchange routing information (e.g. PE routers and ASBRs). In the embodiment shown in FIG. 9, when a host (e.g. a device attached to CE device 14B) wishes to join a multicast group, the host sends a multicast join message via the CE device 14B to the PE router 16B. The PE router 16B receives the multicast join message from the CE group address information for the multicast group (step 902). The receiving PE router 16B then generates an adapted multicast join message by adding the RD for the VPN to the multicast join message (step 904) (for instance of the form rd:source, group). The RD will be dynamically learnt via BGP hence there is no need for a static configuration here. The multicast join message plus RD is then forwarded through the network.

Figure 10:
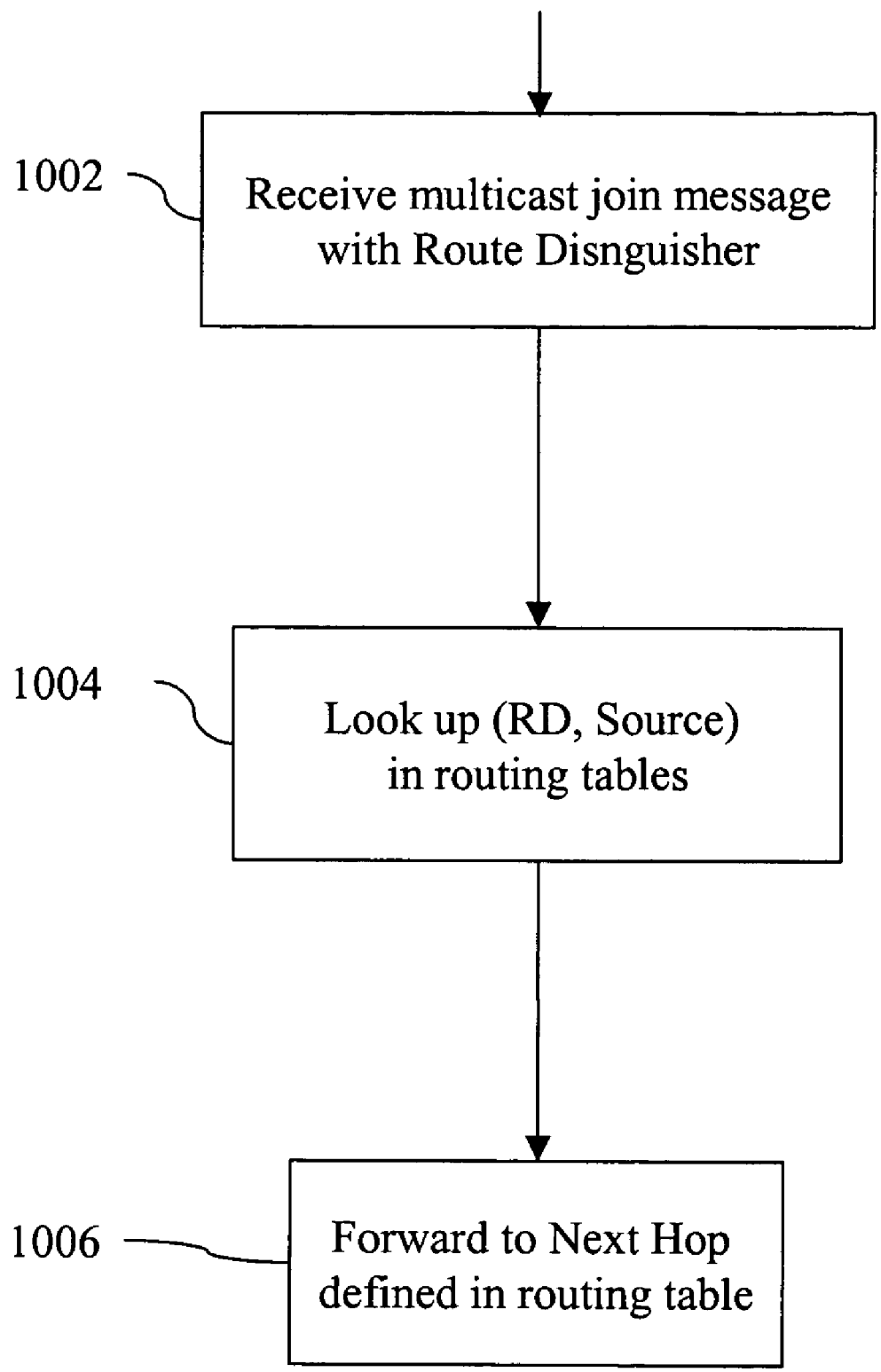
FIG. 10 is a flowchart illustrating a further embodiment of a method for providing multicast messages across a data communication network.

FIG. 10 is a flowchart illustrating an embodiment of a method for providing multicast messages across a data communication network using the RD. The multicast join message with the RD is received by a network node (step 1002). The receiving node then looks up in the forwarding table the routing information for (RD, Source) (step 1004) and forwards the multicast join message with the RD to the Next Hop defined in the routing tables for (RD, Source (Step 1006). When the multicast join message is received by the node determined by the Next Hop, the receiving node forwards the multicast join message to the group-address given in the original multicast join message.

The embodiment illustrated in FIG. 10 may be implemented in nodes that have forwarding information (e.g. VRF). Examples of such nodes are nodes running BGP e.g. PE routers and ASBRs. Nodes that do not have this information (e.g. P routers) will not be able to carry out this look up. Therefore an approach may be implemented that combines the MVS approach and the RD approach. In this case, a PE router is arranged to add a MVS for routing the multicast join message to the AS in which the source is located and then to add a RD for use within the AS of the source. For instance, considering the network shown in FIG. 3, we will consider that a host connected to the CE device 14D wishes to join a multicast group, the source of which is PE router 16A of AS 13A. The host sends a multicast join message. The PE router 16D then generates (step 704) an adapted multicast join message with a Multicast Vector Stack (MVS) and a Route Distinguisher. The vectors of the MVS are determined from the information in the VRF for the address of the multicast group. The vectors of the MVS are limited to addresses within the AS of the host (AS 13B) and any intervening AS and the border router of the destination AS (ASBR 22A). The multicast join message also includes the RD for the VPN. An example of the format of such a message is ip multicast rpf rd vector. The RD will be given by BGP so this will not be statically configured. The PE router then (step 706) sends the multicast join message with the MVS and RD into the network to be forwarded to the first address indicated in the MVS.

As described above with reference to FIG. 8, on receipt of a multicast join message with a MVS (step 802), a node determines if the address at the top of the Multicast Vector Stack (vector 2) is the same as the address of the receiving node (step 804). If this is not the case then the multicast join message with a MVS is forwarded on through the network (step 806) using routing information at the node for the address given at the top of the vector stack. If the address at the top of the Multicast Vector Stack is the same as the address of the receiving node (step 804) (for instance, say the receiving node is ASBR router 22B), then the receiving node removes the vector (vector 2) from the top of the MVS (step 808) and determines whether there is another address in the MVS (step 810). If there is, the receiving node forwards the multicast join message with a MVS on through the network (step 806) towards the address now given at the top of the vector stack (vector 1), according to routing information at the node. These steps may be repeated many times in the network as the multicast join message is routed through the network.

If, at step 810, the MVS does not include any other addresses, the multicast join message is now of the form RD:source, group. The receiving node therefore (as described with reference to FIG. 10), looks up in the VRF (step 1004) the forwarding information for RD, group address as contained in the multicast join message and forwards the multicast join message on through the network (step 1006) towards the address, according to routing information at the node for RD and the group-address. When a multicast join message is received by the node determined by the forwarding information for RD, source address, the receiving node forwards the multicast join message to the group-address given in the original multicast join message.

Thus the network will consider the MVS first (to route through the P routers of the ASs that do not include the source of the multicast group) and then consider the RD.

4.0 Implementation Mechanisms—Hardware Overview

Figure 11:
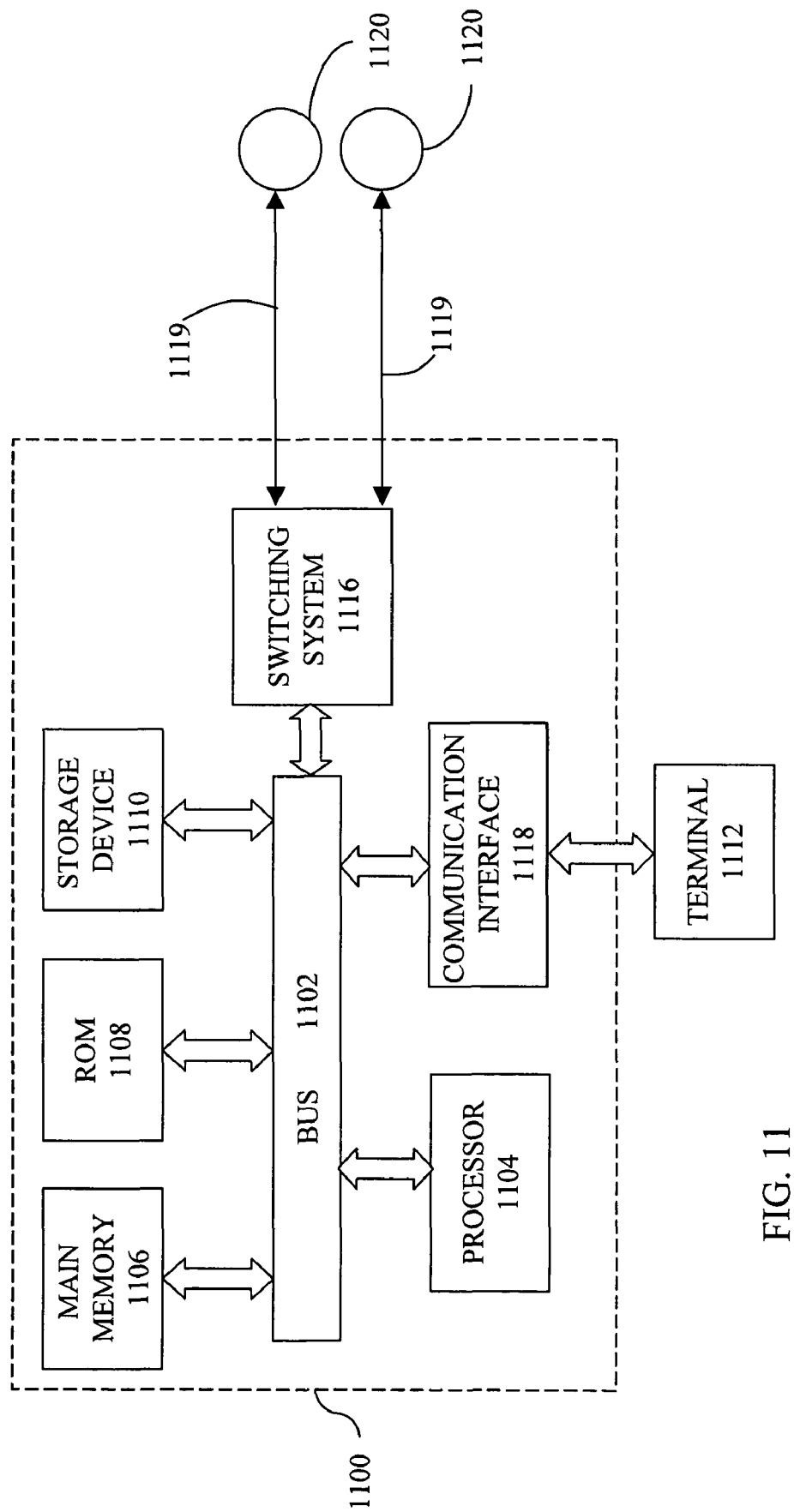
FIG. 11 is a block diagram that illustrates a computer system upon which an embodiment may be implemented.

FIG. 11 is a block diagram that illustrates a computer system 1100 upon which the method may be implemented. The method is implemented using one or more computer programs running on a network element such as a router device. Thus, in this embodiment, the computer system 1100 is a router.

Computer system 1100 includes a bus 1102 or other communication mechanism for communicating information, and a processor 1104 coupled with bus 1102 for processing information. Computer system 1100 also includes a main memory 1106, such as a random access memory (RAM), flash memory, or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk, flash memory or optical disk, is provided and coupled to bus 1102 for storing information and instructions.

A communication interface 1118 may be coupled to bus 1102 for communicating information and command selections to processor 1104. Interface 1118 is a conventional serial interface such as an RS-232 or RS-422 interface. An external terminal 1112 or other computer system connects to the computer system 1100 and provides commands to it using the interface 1118. Firmware or software running in the computer system 1100 provides a terminal interface or character-based command interface so that external commands can be given to the computer system.

A switching system 1116 is coupled to bus 1102 and has an input interface and a respective output interface (commonly designated 1119) to external network elements. The external network elements may include a plurality of additional routers 1120 or a local network coupled to one or more hosts or routers, or a global network such as the Internet having one or more servers. The switching system 1116 switches information traffic arriving on the input interface to output interface 1119 according to pre-determined protocols and conventions that are well known. For example, switching system 1116, in cooperation with processor 1104, can determine a destination of a packet of data arriving on the input interface and send it to the correct destination using the output interface. The destinations may include a host, server, other end stations, or other routing and switching devices in a local network or Internet.

The computer system 1100 implements as a router acting as a node the above described method generating routing information. The implementation is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Interface 1119 also provides a two-way data communication coupling to a network link that is connected to a local network. For example, the interface 1119 may be an integrated services digital network (ISDN) card or a modem to provide a data communication connection to a corresponding type of telephone line. As another example, the interface 1119 may be a local area network (LAN) card to provide a data communication connection to a compatible LAN. Wireless links may also be implemented. In any such implementation, the interface 1119 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 1119, which carry the digital data to and from computer system 1100, are exemplary forms of carrier waves transporting the information.

Computer system 1100 can send messages and receive data, including program code, through the network(s), network link and interface 1119. In the Internet example, a server might transmit a requested code for an application program through the Internet, ISP, local network and communication interface 1118. One such downloaded application provides for the method as described herein.

The received code may be executed by processor 1104 as it is received, and/or stored in storage device 1110, or other non-volatile storage for later execution. In this manner, computer system 1100 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. One or more non-transitory computer readable media storing instructions which, when executed by one or more computing devices, cause the one or more computing devices to perform:
    at a first node, adding to a multicast message a vector stack including addresses of two or more border routers in a path towards a destination of the multicast message, wherein a first address in the vector stack is an address of a second node in a first autonomous system;
    forwarding the multicast message and the vector stack;
    receiving the multicast message and the vector stack at the second node;
    determining that the first address of the vector stack is the address of the second node;
    in response to determining that the first address of the vector stack is the address of the second node, removing the first address from the vector stack, and forwarding the multicast message and the vector stack towards the second address of the addresses in the vector stack, wherein the second address is an address of a third node in a second autonomous system, and wherein the third node is coupled to other nodes in the second autonomous system, and wherein the first node and the second node are unaware of addresses for the other nodes in the second autonomous system.

2. One or more non-transitory computer-readable media as recited in claim 1, wherein the multicast message is a multicast Join message.

3. One or more non-transitory computer-readable media as recited in claim 1, wherein the instructions, when executed by the one or more computing devices, cause the one or more computing devices to perform adding the vector stack at least in part by adding to the vector stack addresses of at least one router in each autonomous system of two or more autonomous systems between a source of the multicast message and a destination of the multicast message.

4. One or more non-transitory computer-readable media as recited in claim 1, wherein the instructions, when executed by the one or more computing devices, cause the one or more computing devices to perform adding the vector stack at least in part by adding to the vector stack addresses of any border router in each autonomous system of two or more autonomous systems in a path between a source of the multicast message and a destination of the multicast message.

5. One or more non-transitory computer-readable media as recited in claim 1, wherein the second node is an Autonomous System Boundary Router (ASBR) of the first autonomous system, and wherein the third node is an ASBR of the second autonomous system.

6. One or more non-transitory computer-readable media as recited in claim 1, wherein the instructions, when executed by the one or more computing devices, cause the one or more computing devices to perform adding the vector stack by adding to the vector stack the address of each Autonomous System Boundary Router (ASBR) of a plurality of ASBRs to be traversed on a path between a source of the multicast message and a destination of the multicast message; wherein the second node is a first ASBR of the first autonomous system and the third node is a second ASBR of the second autonomous system.

7. One or more non-transitory computer-readable media as recited in claim 1, wherein the instructions when executed by the one or more computing devices, cause the one or more computing devices to perform determining the addresses of the two or more border routers to be added to the vector stack from forwarding information.

8. One or more non-transitory computer-readable media as recited in claim 1, wherein the instructions, when executed by the one or more computing devices, cause the one or more computing devices to perform:
    repeating as necessary until the multicast message is received by a final address of the addresses in the vector stack:
        receiving the multicast message and the vector stack at another node;
        determining that another address of the vector stack is an address of the other node;
        in response to the determining that the other address of the vector stack is the address of the other node, removing the other address from the vector stack, and forwarding the multicast message and the vector stack towards a next address of the addresses in the vector stack.

9. One or more non-transitory computer-readable media as recited in claim 1, wherein the instructions, when executed by the one or more computing devices, cause the one or more computing devices to perform:
adding to the multicast message a route distinguisher relevant to the multicast message;
forwarding the multicast message and the route distinguisher;
identifying a next-hop based on the route distinguisher;
wherein the route distinguisher identifies a virtual private network comprising a multicast distribution tunnel that spans the first autonomous system and the second autonomous system.

10. One or more apparatuses for providing multicast messages across a data communication network, the one or more apparatuses comprising:
one or more network interfaces that are coupled to the data network for receiving and sending one or more packets therefrom and sending one or more packets thereto;
one or more processors;
one or more non-transitory computer-readable media storing one or more stored sequences of instructions which, when executed by one or more processors, cause the one or more processors to carry out the steps of:
at a first node, adding to a multicast message a vector stack including addresses of two or more border routers in a path towards a destination of the multicast message, wherein a first address in the vector stack is an address of a second node in a first autonomous system;
forwarding the multicast message and the vector stack;
receiving the multicast message and the vector stack at the second node;
determining that the first address of the vector stack is the address of the second node;
in response to determining that the first address of the vector stack is the address of the second node, removing the first address from the vector stack, and forwarding the multicast message and the vector stack towards a second address of the addresses in the vector stack, wherein the second address is an address of a third node in a second autonomous system, and wherein the third node is coupled to other nodes in the second autonomous system, and wherein the first node and the second node are unaware of addresses for the other nodes in the second autonomous system.

11. One or more apparatuses as recited in claim 10, wherein the multicast message is a multicast Join message.

12. One or more apparatuses as recited in claim 10, wherein the instructions, when executed by the one or more processors, cause the one or more processors to perform adding the vector stack at least in part by adding to the vector stack addresses of at least one router in each autonomous system of two or more autonomous systems between a source of the multicast message and a destination of the multicast message.

13. One or more apparatuses as recited in claim 10, wherein the instructions, when executed by the one or more processors, cause the one or more processors to perform adding the vector stack at least in part by adding to the vector stack addresses of any border router in each autonomous system of two or more autonomous systems in a path between a source of the multicast message and a destination of the multicast message.

14. One or more apparatuses as recited in claim 10, wherein the second node is an Autonomous System Boundary Router (ASBR) of the first autonomous system, and wherein the third node is an ASBR of the second autonomous system.

15. One or more apparatuses as recited in claim 10, wherein the instructions, when executed by the one or more processors, cause the one or more processors to perform adding the vector stack by adding to the vector stack the address of each Autonomous System Boundary Router (ASBR) of a plurality of ASBRs to be traversed on a path between a source of the multicast message and a destination of the multicast message; wherein the second node is a first ASBR of the first autonomous system and the third node is a second ASBR of the second autonomous system.

16. One or more apparatuses as recited in claim 10, wherein the instructions, when executed by the one or more processors, cause the one or more processors to perform determining the addresses of the two or more border routers to be added to the vector stack from forwarding information.

17. One or more apparatuses as recited in claim 10, wherein the instructions, when executed by the one or more processors, cause the one or more processors to perform:
repeating as necessary until the multicast message is received by a final address of the addresses in the vector stack:
receiving the multicast message and the vector stack at another node;
determining that another address of the vector stack is an address of the other node;
in response to the determining that the other address of the vector stack is the address of the other node, removing the other address from the vector stack, and forwarding the multicast message and the vector stack towards a next address of the addresses in the vector stack.

18. One or more apparatuses as recited in claim 10, wherein the instructions, when executed by the one or more processors, cause the one or more processors to perform:
adding to the multicast message a route distinguisher relevant to the multicast message;
forwarding the multicast message and the route distinguisher;
identifying a next-hop based on the route distinguisher;
wherein the route distinguisher identifies a virtual private network comprising a multicast distribution tunnel that spans the first autonomous system and the second autonomous system.

19. A method for providing multicast messages across a data communication network, the method comprising:
at a first node, adding to a multicast message a vector stack including addresses of two or more border routers in a path towards a destination of the multicast message, wherein a first address in the vector stack is an address of a second node in a first autonomous system;
forwarding the multicast message and the vector stack;
receiving the multicast message and the vector stack at the second node;
determining that the first address of the vector stack is the address of the second node;
in response to determining that the first address of the vector stack is the address of the second node, removing the first address from the vector stack, and forwarding the multicast message and the vector stack towards the second address of the addresses in the vector stack, wherein the second address is an address of a third node in a second autonomous system, and wherein the third node is coupled to other nodes in the second autonomous system, and wherein the first node and the second node are unaware of addresses for the other nodes in the second autonomous system;

wherein the method is performed by one or more computing devices.

20. A method as recited in claim 19, wherein the multicast message is a multicast Join message.

21. A method as recited in claim 19, wherein adding the vector stack comprises adding to the vector stack addresses of at least one router in each autonomous system of two or more autonomous systems between a source of the multicast message and a destination of the multicast message.

22. A method as recited in claim 19, wherein adding the vector stack comprises adding to the vector stack addresses of any border router in each autonomous system of two or more autonomous systems in a path between a source of the multicast message and a destination of the multicast message.

23. A method as recited in claim 19, wherein the second node is an Autonomous System Boundary Router (ASBR) of the first autonomous system, and wherein the third node is an ASBR of the second autonomous system.

24. A method as recited in claim 19, wherein adding the vector stack comprises adding to the vector stack the address of each Autonomous System Boundary Router (ASBR) of a plurality of ASBRs to be traversed on a path between a source of the multicast message and a destination of the multicast message; wherein the second node is a first ASBR of the first autonomous system and the third node is a second ASBR of the second autonomous system.

25. A method as recited in claim 19, further comprising determining the addresses of the two or more border routers to be added to the vector stack from forwarding information.

26. A method as recited in claim 19, further comprising:
repeating as necessary until the multicast message is received by a final address of the addresses in the vector stack:
receiving the multicast message and the vector stack at another node;
determining that another address of the vector stack is an address of the other node;
in response to the determining that the other address of the vector stack is the address of the other node, removing the other address from the vector stack, and forwarding the multicast message and the vector stack towards a next address of the addresses in the vector stack.

27. A method as recited in claim 19, further comprising:
adding to the multicast message a route distinguisher relevant to the multicast message;
forwarding the multicast message and the route distinguisher;
identifying a next-hop based on the route distinguisher;
wherein the route distinguisher identifies a virtual private network comprising a multicast distribution tunnel that spans the first autonomous system and the second autonomous system.

* * * * *